(12) United States Patent
Sundaram et al.

(10) Patent No.: US 8,869,244 B1
(45) Date of Patent: Oct. 21, 2014

(54) TECHNIQUES FOR PROVIDING ROLE-BASED ACCESS CONTROL USING DYNAMIC SHARED ACCOUNTS

(75) Inventors: Sharada Sundaram, Mountain View, CA (US); Sanjay Sawhney, Cupertino, CA (US); Robert Koeten, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 138 days.

(21) Appl. No.: 13/340,264

(22) Filed: Dec. 29, 2011

Related U.S. Application Data (60) Provisional application No. 61/482,189, filed on May 3, 2011.

(51) Int. Cl.
  G06F 7/04    (2006.01)
  G06F 21/62   (2013.01)
  G06F 21/60   (2013.01)
  H04L 29/06   (2006.01)

(52) U.S. Cl.
  CPC ............. *G06F 21/62* (2013.01); *H04L 63/08* (2013.01); *G06F 21/6218* (2013.01); *G06F 21/604* (2013.01)
  USPC .......................................................... 726/4

(58) Field of Classification Search
  CPC ... G06F 21/62; G06F 21/604; G06F 21/6218; H04L 63/08
  USPC ....................................................... 726/2, 4
  See application file for complete search history.

(56) References Cited

U.S. PATENT DOCUMENTS

| | | | |
|---|---|---|---|
| 2005/0204048 A1* | 9/2005 | Pujol et al. | 709/229 |
| 2006/0129817 A1* | 6/2006 | Borneman et al. | 713/170 |
| 2008/0022370 A1* | 1/2008 | Beedubail et al. | 726/4 |
| 2011/0023107 A1* | 1/2011 | Chen et al. | 726/12 |
| 2011/0231899 A1* | 9/2011 | Pulier et al. | 726/1 |

OTHER PUBLICATIONS

Markus Lorch, Dennis Kafura, . . . "Authorization and Account Management in the Open Science Grid" 2005, IEEE.*

* cited by examiner

*Primary Examiner* — Samson Lemma
(74) *Attorney, Agent, or Firm* — Wilmer Cutler Pickering Hale and Dorr LLP (57) ABSTRACT

Techniques for providing role-based access control using dynamic shared accounts are disclosed. In one particular exemplary embodiment, the techniques may be realized as a system and method for providing role-based access using dynamic shared accounts. For example, the system may comprise one or more processors communicatively coupled to a network. The one or more processors may be configured to: receive a request for access to an account, wherein the request comprises an identifier associated with a user; authenticate the user for access to the account; identify one or more predetermined roles associated with the account for the user; identify one or more pseudo accounts corresponding to the one or more predetermined roles; map the user to the one or more pseudo accounts; and provide user access to the account based on the mapping and with access privileges associated with the one or more predetermined roles associated with the user.

20 Claims, 6 Drawing Sheets

TECHNIQUES FOR PROVIDING ROLE-BASED ACCESS CONTROL USING DYNAMIC SHARED ACCOUNTS

CROSS-REFERENCE TO RELATED APPLICATIONS

This patent application claims priority to U.S. Provisional Patent Application No. 61/482,189, filed May 3, 2011, which is hereby incorporated by reference herein in its entirety.

FIELD OF THE DISCLOSURE

The present disclosure relates generally to network monitoring and, more particularly, to techniques for providing role-based access control using dynamic shared accounts.

BACKGROUND OF THE DISCLOSURE

Cloud services are becoming increasingly popular. Software-as-a-Service (SaaS) is a cloud service and has its own specification of roles and permissions. Application programming interfaces (APIs) associated with SaaS may not be generic and vary from provider to provider. As a result, a setup on one particular SaaS may therefore be different than a setup on another SaaS. Therefore, role-based access control may be difficult to implement, especially across multiple SaaS or cloud service platforms.

In view of the foregoing, it may be understood that there may be significant problems and shortcomings associated with conventional role-based access control technologies as applied to SaaS infrastructure.

SUMMARY OF THE DISCLOSURE

Techniques for providing role-based access control using dynamic shared accounts are disclosed. In one particular exemplary embodiment, the techniques may be realized as a system for providing role-based access using dynamic shared accounts. For example, the system may comprise one or more processors communicatively coupled to a network. The one or more processors may be configured to receive a request for access to an account, wherein the request comprises an identifier associated with a user. The one or more processors may be configured to authenticate the user for access to the account. The one or more processors may be configured to identify one or more predetermined roles associated with the account for the user. The one or more processors may be configured to identify one or more pseudo accounts corresponding to the one or more predetermined roles; map the user to the one or more pseudo accounts. The one or more processors may be configured to provide user access to the account based on the mapping and with access privileges associated with the one or more predetermined roles associated with the user.

In accordance with other aspects of this particular exemplary embodiment, the account may be a shared Software-as-a-Service (SaaS) account.

In accordance with further aspects of this particular exemplary embodiment, the identifier may comprise at least one of a user identifier and password.

In accordance with additional aspects of this particular exemplary embodiment, authenticating the user may further comprise providing single sign-on access to at least the account.

In accordance with other aspects of this particular exemplary embodiment, mapping the user to the one or more pseudo accounts may comprise a dynamic mapping. The dynamic mapping may further comprise performing an action in the event the one or more pseudo accounts are unavailable. In some embodiments, the action may comprise at least one of following: notifying the user of the unavailability of the one or more pseudo accounts; halting the mapping action; and determining availability of one or more other pseudo accounts of equal or lesser access privileges and mapping the user to the one or more other pseudo accounts.

In accordance with further aspects of this particular exemplary embodiment, the one or more processors are further configured to: receive a request for access to a second account; authenticate the user for access to the second account based on a single sign-on access to the second account; identify one or more predetermined roles associated with the second account for the user; identify one or more pseudo accounts corresponding to the one or more predetermined roles associated with the second account; map the user to the one or more pseudo accounts associated with the second account; and provide access to the second account based on the mapping and with access privileges associated with the one or more predetermined roles associated with the user for the second account.

In another particular exemplary embodiment, the techniques may be realized as a method for providing role-based access using dynamic, shared accounts. The method may comprise receiving a request for access to an account, wherein the request comprises an identifier associated with a user. The method may further comprise authenticating, using at least one computer processor, the user for access to the account. The method may also comprise identifying one or more predetermined roles associated with the account for the user. The method may comprise identifying one or more pseudo accounts corresponding to the one or more predetermined roles. The method may also comprise mapping the user to the one or more pseudo accounts. The method may further comprise providing user access to the account based on the mapping and with access privileges associated with the one or more predetermined roles associated with the user.

In accordance with other aspects of this particular exemplary embodiment, the account may be a shared Software-as-a-Service (SaaS) account.

In accordance with further aspects of this particular exemplary embodiment, the identifier may comprise at least one of a user identifier and password.

In accordance with additional aspects of this particular exemplary embodiment, authenticating the user may further comprise providing single sign-on access to at least the account.

In accordance with other aspects of this particular exemplary embodiment, mapping the user to the one or more pseudo accounts may comprise a dynamic mapping. The dynamic mapping may further comprise performing an action in the event the one or more pseudo accounts are unavailable. In some embodiments, the action may comprise at least one of following: notifying the user of the unavailability of the one or more pseudo accounts; halting the mapping action; and determining availability of one or more other pseudo accounts of equal or lesser access privileges and mapping the user to the one or more other pseudo accounts.

In accordance with further aspects of this particular exemplary embodiment, the one or more processors are further configured to: receive a request for access to a second account; authenticate the user for access to the second account based on a single sign-on access to the second account; identify one or more predetermined roles associated with the second account for the user; identify one or more pseudo accounts corresponding to the one or more predetermined roles associated with the second account; map the user to the one or more pseudo accounts associated with the second account; and provide access to the second account based on the mapping and with access privileges associated with the one or more predetermined roles associated with the user for the second account.

In another particular exemplary embodiment, the techniques may be realized as a system for providing role-based access using dynamic shared accounts. The system may comprise one or more processors communicatively coupled to a network. The one or more processors may be configured to create at least one account associated with a service. The one or more processors may be configured to create one or more roles for the at least one account. The one or more processors may be configured to create at least one pseudo account corresponding to each of the one or more roles. The one or more processors may be configured to assign at least one of the one or more roles to a user for dynamically mapping the user to the at least one pseudo account for access to the at least one account based on the one or more roles.

In accordance with additional aspects of this particular exemplary embodiment, the at least one account may be at least one shared account and the service is a Software-as-a-Service.

In another particular exemplary embodiment, the techniques may be realized as a method for providing role-based access using dynamic shared accounts. The method may comprise creating at least one account associated with a service. The method may comprise creating one or more roles for the at least one account. The method may comprise creating, using at least one computer processor, at least one pseudo account corresponding to each of the one or more roles. The method may comprise creating assigning at least one of the one or more roles to a user for dynamically mapping the user to the at least one pseudo account for access to the at least one account based on the one or more roles.

In accordance with other aspects of this particular exemplary embodiment, the at least one account may be at least one shared account and the service is a Software-as-a-Service.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
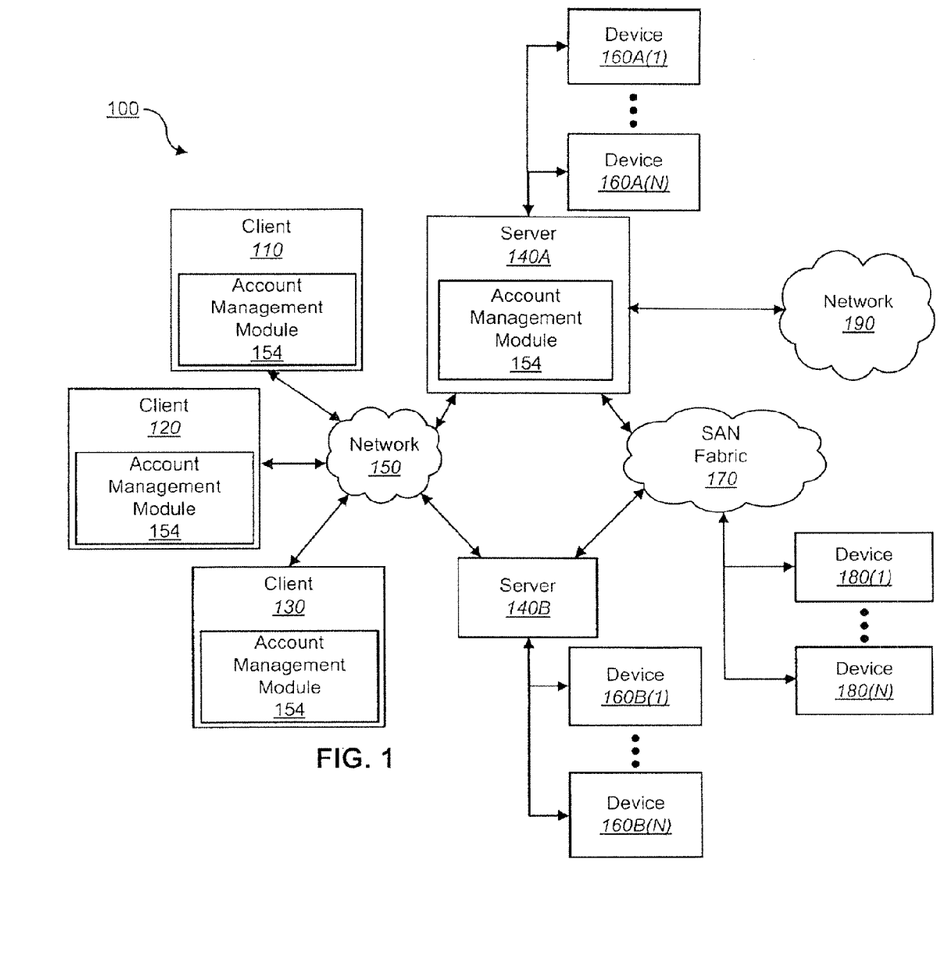
FIG. 1 shows a block diagram depicting a network architecture for providing role-based access control using dynamic shared accounts in accordance with an embodiment of the present disclosure.

FIG. 1 shows a block diagram depicting a network architecture 100 for providing role-based access control using dynamic shared accounts in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., account management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
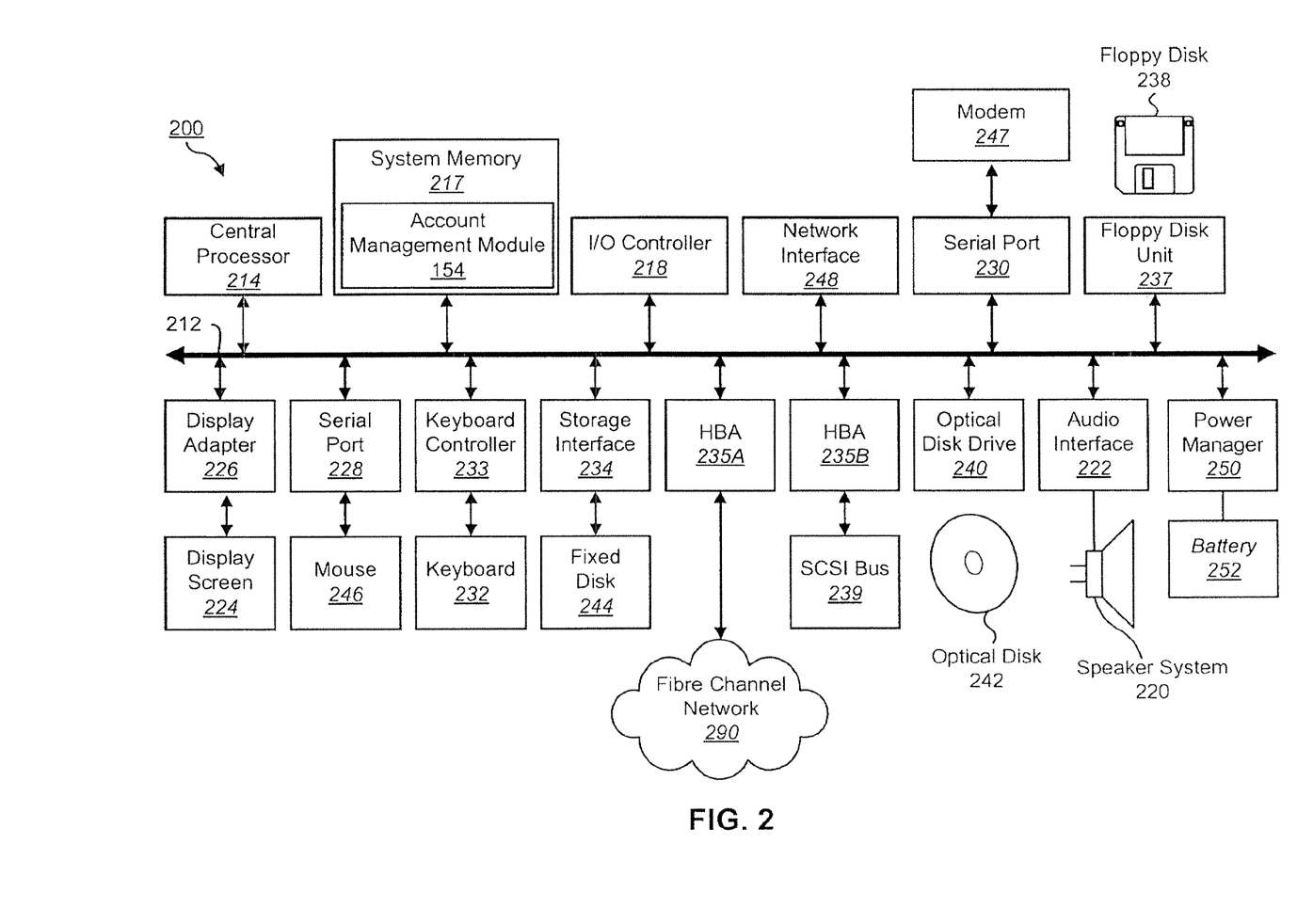
FIG. 2 depicts a block diagram of a computer system for providing role-based access control using dynamic shared accounts in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for providing role-based access control using dynamic shared accounts such as, for example, account management module 154. As illustrated, one or more portions of account management module 154 may reside at a network centric location. For example, server 140A may be a server, a firewall, a gateway, or other network element that may perform one or more actions to provide role-based access control using dynamic shared accounts. According to some embodiments, network 190 may be an external network (e.g., the Internet) and server 140A may be a gateway or firewall between one or more internal components and clients and the external network.

Account management module 154 may provide, among other things, role-based access control (RBAC) for Software-as-a-Service (SaaS) or a cloud computing model for an enterprise. On the SaaS provider side, at least one account may be setup. Each of the at least one accounts may be setup with specific permissions for a designated role in the organization. Furthermore, each account may be pre-configured with variable access rights for one or more users.

When a user logs in to access one or more features of one or more SaaS, account management module 154 may be responsible for single sign on, user identification, authentication and authorization for all the users. For example, account management module 154 may not only grant access to the user (e.g., via single sign-on), but also provision a particular account to one or more SaaS providers associated with the account management module 154. Based on the role and responsibility of the user in an organization or company, the user may be dynamically provisioned to any one of the pre-configured user accounts. Thus, the access of the user on the SaaS application may be accessible and/or restricted based on role and his permissions.

Accordingly, account management module 154 may integrate role-based access control throughout an organization without dependency on the SaaS provider and/or specific implementation requirements of the SaaS. By dynamically mapping each of a plurality of users to one or more accounts for one or more of the various roles created for one or more SaaS, role-based access control using dynamic shared accounts may be provided to a SaaS applications on the cloud through federated identity management.

FIG. 2 depicts a block diagram 200 of a computer system for providing role-based access control using dynamic shared accounts in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, account management module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure.

The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
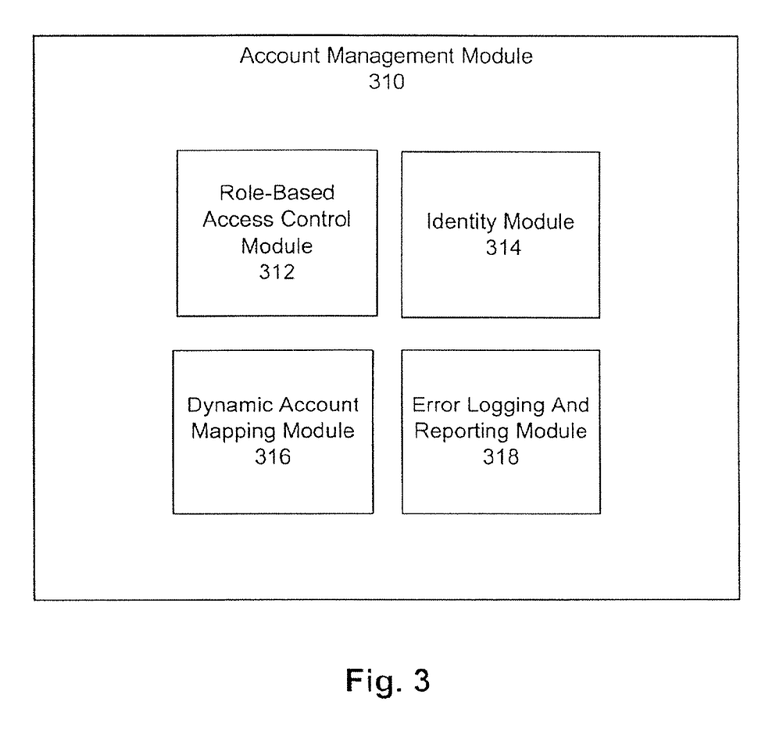
FIG. 3 shows a module for providing role-based access control using dynamic shared accounts in accordance with an embodiment of the present disclosure.

FIG. 3 shows a module 310 for providing role-based access control using dynamic shared accounts in accordance with an embodiment of the present disclosure. Referring to FIG. 3, there is shown a account management module 310 in accordance with an embodiment of the present disclosure. As illustrated, the account management module 310 may contain one or more components including role-based access control module 312, identity module 314, dynamic account mapping module 316, and error logging and reporting module 318.

The description below describes network elements, computers, and/or components of a system and method for providing role-based access control using dynamic shared accounts that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Role-based access control module 312 may request creation of one or more accounts with one or more SaaS. Role-based access control module 312 may create one or more profiles. Each of the one or more profiles may provide permissions for either a specific object or a set of objects. For each role that represents a specific job function, role-based access control module 312 may assign a specific set of permissions profile applicable to that role. For each role, role-based access control module 312 may create at least one account on the SaaS provider. It should be appreciated that many accounts may be created for a particular role to enable multiple users to login at the same time. As used herein, these accounts may be referred to as "pseudo accounts." In effect, one or more pseudo accounts may serve as one or more slots associated with a particular role for an account at the SaaS provider.

In some embodiments, a user may have hold one role for a specific application. Here, when the user switches application, the user may assume a different role and may perform an action specific to that role. However, this may not always be the case.

In some embodiments, roles for each pseudo account may differ for each user across various applications. For example, an employee may have employee-level access in one SaaS application and may be a system administrator for another SaaS application.

One benefit with role-based access control using dynamic shared accounts across multiple applications may be that if any updates to the various roles needed to occur, access privileges may be adjusted through adjustments in the pseudo account level. Any user associated with that particular role would receive a corresponding change in accessibility and privilege to their user account. This may provide greater flexibility, efficiency, and reliability.

Identity module 314 may provide a user interface to a plurality of users in an organization. For example, rather than directly logging in to an individual account at the SaaS application, a user may log into via this user interface. Identity module 314 may provide, among other things, various features, including, but not limited to single sign-on, user identification, authentication and authorization, and/or role-based verification.

One benefit with using identity module 314 may be that users seeking access to one or more SaaS applications may be allowed, e.g., via a single sign on procedure, to access one or more accounts on a plurality of SaaS applications without logging in multiple times. Again, this may provide greater flexibility and efficiency.

Dynamic account mapping module 316 may map each user who logs in via identity module 314 to one or more pseudo accounts. Mapping to these pseudo accounts may be dynamic. As described above, since there may be a limited number of pseudo account created for each role at each SaaS, dynamic account mapping module 316 may be able to assign one or more users to access to each SaaS based on an availability of each pseudo account or take other priority measures.

Error logging and reporting module 318 may produce logs, reports, or other information associated with providing role-based access control using dynamic shared accounts.

Figure 4:
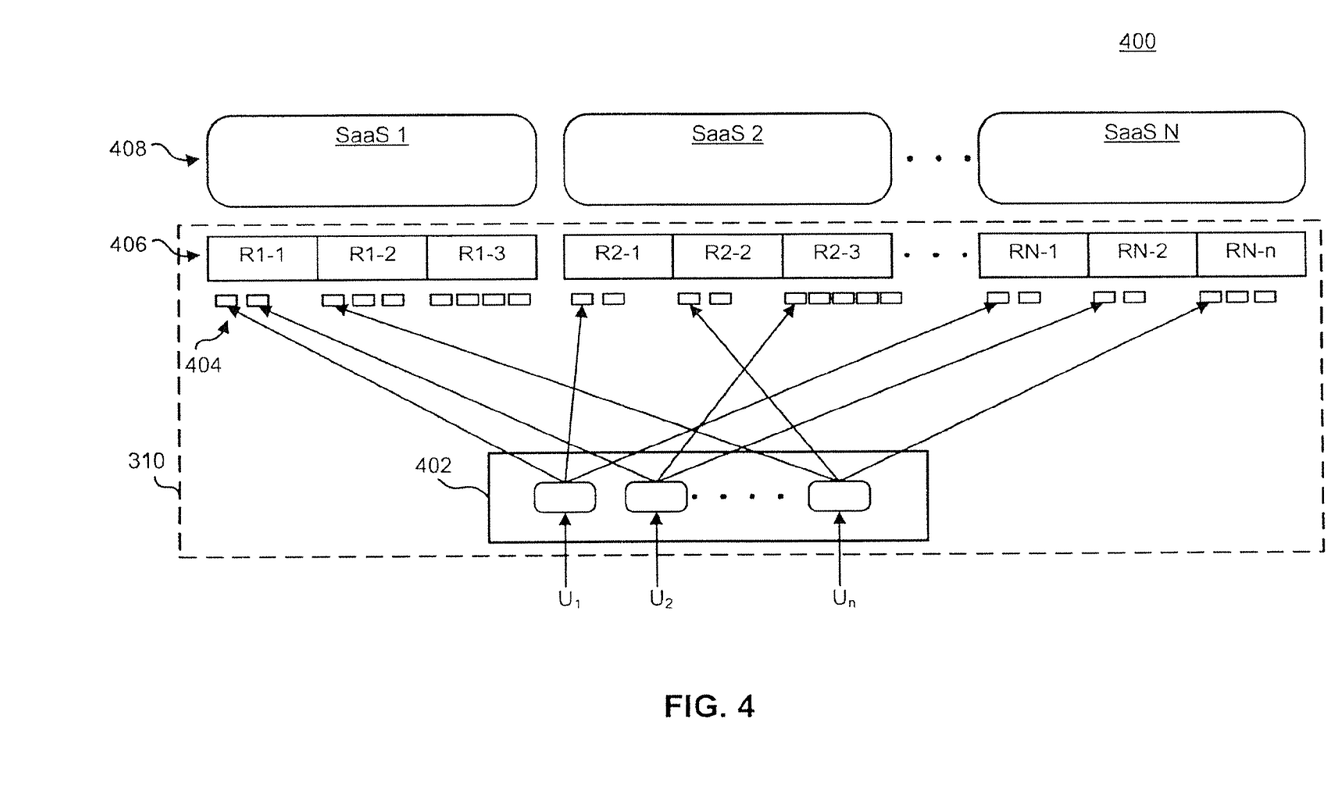
FIG. 4 depicts a mapping schematic for providing role-based access control using dynamic shared accounts in accordance with an embodiment of the present disclosure.

FIG. 4 depicts a mapping schematic 400 for providing role-based access control using dynamic shared accounts in accordance with an embodiment of the present disclosure. Referring to FIG. 4, a plurality of users, $U_1, U_2, \ldots, U_n$, may seek access to one or more cloud services, e.g., SaaS 1, SaaS 2, . . . , SaaS n. To gain access, each user $U_1$, $U_2$, or $U_n$ may login to corresponding user accounts 402 at the account management module 310. The user accounts 402 may be mapped to one or more pseudo accounts 404 based on predetermined roles 406 for the SaaS 408.

For example, SaaS 1 may be a sales service, such as SalesForce.com, SaaS 2 may be an accounting service, such as Concur Expense Reporting, and SaaS N may be a GoogleDocs document service, where N may be an integer. There may be accounts created at SaaS 1 with the following corresponding roles: R1-1, R1-2, and R1-3. R1-1 may be directed to a sales manager role, R1-2 may be directed to a sales representative role, and R1-3 may be directed to public view role. There may be accounts created at SaaS 2 with the following corresponding roles: R2-1, R2-2, and R2-3. R2-1 may be directed to a finance role, R2-2 may be directed to a manager role, and R2-3 may be directed to an employee role. There may be accounts created at SaaS 3 with the following corresponding roles: RN-1, RN-2, and R1-n. RN-1 may be directed to a full editor role, RN-2 may be directed to a partial editor role, and RN-n may be directed to read-only role, where n may be an integer.

When a user $U_1$ logs in via the account management module 310, user $U_1$ may have sales manager privileges at SaaS 1, finance privileges at SaaS 2, and full editor access at SaaS N. In this example, user $U_1$ may be an executive at a particular corporation who has full or almost full access to all the SaaS applications.

User $U_2$ may also log in via the account management module 310. While user $U_2$ may have sales manager access to SaaS 1, user $U_2$ may have only employee access in SaaS 2 and partial editor access in SaaS N. As a result, depending on an employee's role in an organization, his or her user-level access to one or more SaaS applications may be preconfigured accordingly in the accounts management module 310.

User $U_n$ may also log in at the same time that user $U_1$ and user $U_2$ are logged in. In one scenario, $U_n$ may also have sales manager privileges to SaaS 1. However, since user $U_1$ and user $U_2$ are already logged in to the only two pseudo accounts created for that role, R1-1, user $U_n$ may not have access to SaaS 1 as a sales manager at that time. In some embodiments, user $U_n$ may be denied access. In other embodiments, user $U_n$ may be asked to wait. In yet other embodiments, user $U_n$ may be granted access to another role that would provide equal or lesser access privileges than R1-1. For example, user $U_n$ may be offered access to R1-2 instead. Here, user $U_n$ may accept since user $U_n$ may only need to access information on SaaS 1 that both sales managers and sales representatives can access. Therefore, account management module 310 may provide dynamic mapping to the one or more shared accounts for each of the plurality of SaaS applications.

Figure 5:
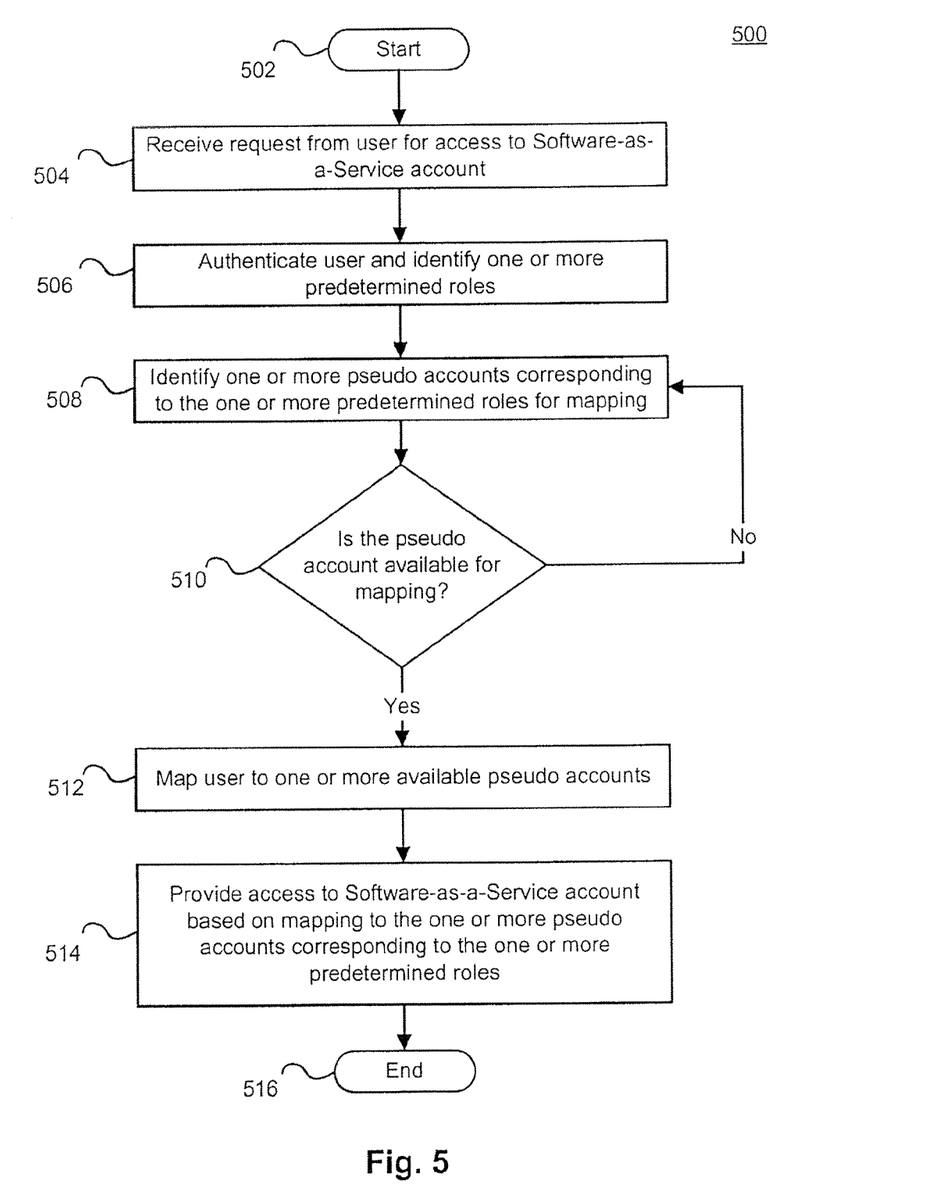
FIG. 5 depicts a flowchart of a method for providing role-based access control using dynamic shared accounts in accordance with an embodiment of the present disclosure.

FIG. 5 depicts a flowchart 500 of a method for providing role-based access control using dynamic shared accounts in accordance with an embodiment of the present disclosure. The exemplary method 500 is provided by way of example, as there are a variety of ways to carry out methods disclosed herein. The method 500 shown in FIG. 5 may be executed or otherwise provided. Referring to FIG. 5, the exemplary method 500 may begin at block 502.

At block 502, the method 500 may begin.

At block 504, a request from a user may be received at the account management module 310. The request may be for access to one or more Software-as-a-Service (SaaS) accounts. The request may include a user identifier, password, and/or other identifier.

At block 506, the account management module 310 may authenticate the user using a variety of authentication techniques. For example, the user may be authenticated based on one or more profiles associated with data associated with the user, e.g., user identifier, password, and/or other identifier. In addition authentication, one or more predetermined roles associated with one or more accounts of the SaaS may be identified.

At block 508, the account management module 310 may identify one or more pseudo accounts corresponding to the one or more predetermined roles for mapping the user to the one or more pseudo accounts. In some embodiments, availability of the one or more pseudo accounts may be determined 510. If, for example, the one or more pseudo accounts are not available for mapping, e.g., because the one or more pseudo accounts are being accessed by other users in the organization at the time of the request/mapping, mapping the user to the one or more pseudo accounts may halt and continue at a later time. In some embodiments, other available pseudo accounts corresponding to other equal or lesser roles may be made available to the user. In other embodiments, the user may simply be denied access to the account and would try mapping later.

At block 512, the account management module 310 may map the user to the one or more pseudo accounts in the event the one or more pseudo account is available for mapping. As discussed above, in some cases, the account management module 310 may map the user to another pseudo account with equal or lesser privileges if the pseudo account corresponding to the predetermined roles is unavailable.

At block 514, the account management module 310 may provide access to the one or more Software-as-a-Service accounts based on the mapping of the user to the one or more pseudo accounts corresponding to the one or more predetermined roles of the user.

At block 516, the method 500 may end.

Figure 6:
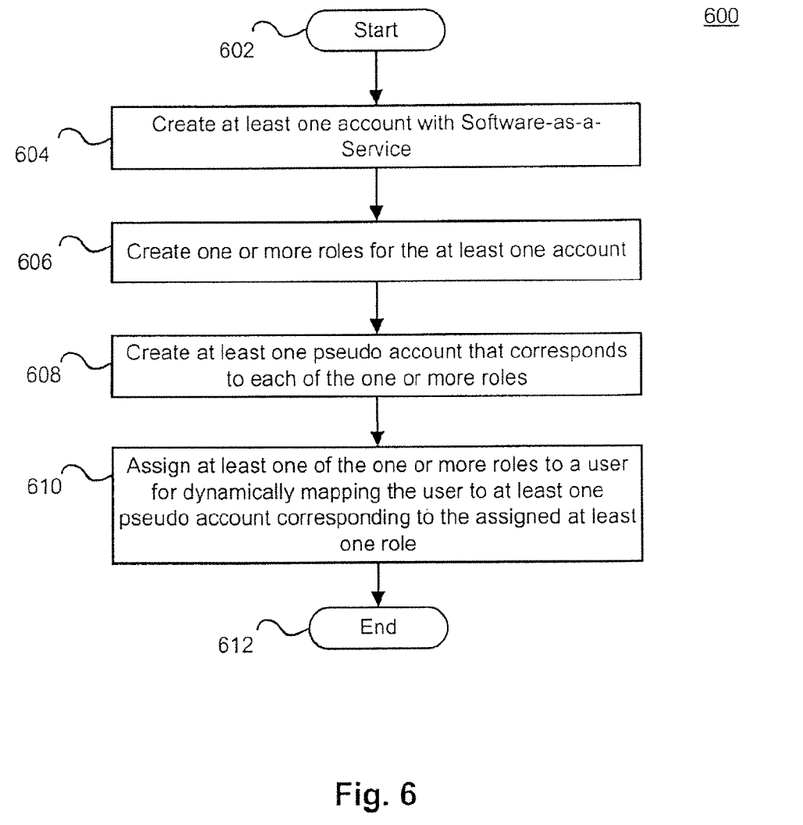
FIG. 6 depicts a flowchart of a method for providing role-based access control using dynamic shared accounts in accordance with an embodiment of the present disclosure.

FIG. 6 depicts a flowchart 600 of a method for providing role-based access control using dynamic shared accounts in accordance with an embodiment of the present disclosure. The exemplary method 600 is provided by way of example, as there are a variety of ways to carry out methods disclosed herein. The method 600 shown in FIG. 6 may be executed or otherwise performed by one or a combination of various systems. The method 600 is described below as carried out by at least system 100 in FIG. 1, architecture 200 in FIG. 2, module 310 in FIG. 3, and schematic 400 of FIG. 4, by way of example, and various elements of systems 100, 200, 310, and 400 are referenced in explaining the exemplary method of FIG. 6. Each block shown in FIG. 6 represents one or more processes, methods, or subroutines carried in the exemplary method 600. A non-transitory computer-readable medium comprising code, which when performed by a computer, may perform the acts of the method 600 may also be provided. Referring to FIG. 6, the exemplary method 600 may begin at block 602.

At block 602, the method 600 may begin.

At block 604, at least one account may be created with a Software-as-a-Service (SaaS). In some embodiments, this may be achieved using the account management module 310. The account may be a shared account with preconfigured rules and privileges.

At block 606, one or more roles for the at least one account may be created. These roles may also have preconfigured rules and privileges based on needs of an organization's policies and roles of its users. In some embodiments, this may be achieved using the account management module 310.

At block 608, at least one pseudo account corresponding to each of the one or more roles may be created. In some embodiments, this may be achieved using the account management module 310.

At block 610, at least one of the one or more roles may be assigned to a user for dynamically mapping the user to at least one pseudo account for access to the one or more SaaS account based on the one or more roles. In some embodiments, this may be achieved using the account management module 310.

At block 612, the method 600 may end.

At this point it should be noted that providing role-based access control using dynamic shared accounts in accordance with the present disclosure as described above typically involves the processing of input data and the generation of output data to some extent. This input data processing and output data generation may be implemented in hardware or software. For example, specific electronic components may be employed in a account management module or similar or related circuitry for implementing the functions associated with providing role-based access control using dynamic shared accounts in accordance with the present disclosure as described above. Alternatively, one or more processors operating in accordance with instructions may implement the functions associated with providing role-based access control using dynamic shared accounts in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for providing role-based access using dynamic shared accounts comprising:
   one or more processors communicatively coupled to a network, wherein the one or more processors are configured to:
      receive a request for access to an account, wherein the request comprises an identifier associated with a user;
      authenticate the user for access to the account;
      identify one or more predetermined roles associated with the account for the user;
      identify one or more pseudo accounts corresponding to the one or more predetermined roles, wherein the one or more pseudo accounts enable role-based access control using dynamic shared accounts compatible across multiple applications;
      determine availability of the one or more pseudo accounts and possible alternative pseudo accounts based upon current status;
      map the user to the one or more pseudo accounts; and
      provide user access to the account based on the mapping and with access privileges associated with the one or more predetermined roles associated with the user.

2. The system of claim 1, wherein the account is a shared Software-as-a-Service (SaaS) account.

3. The system of claim 1, wherein the identifier comprises at least one of a user identifier and password.

4. The system of claim 1, wherein authenticating the user further comprises providing single sign-on access to at least the account.

5. The system of claim 1, wherein mapping the user to the one or more pseudo accounts comprises a dynamic mapping, wherein the dynamic mapping comprises performing an action in the event the one or more pseudo accounts are unavailable.

6. The system of claim 5, wherein the action comprises at least one of following: notifying the user of the unavailability of the one or more pseudo accounts; halting the mapping action; and determining availability of one or more other pseudo accounts of equal or lesser access privileges and mapping the user to the one or more other pseudo accounts.

7. The system of claim 1, wherein the one or more processors are further configured to:
   receive a request for access to a second account;
   authenticate the user for access to the second account based on a single sign-on access to the second account;
   identify one or more predetermined roles associated with the second account for the user;
   identify one or more pseudo accounts corresponding to the one or more predetermined roles associated with the second account;
   map the user to the one or more pseudo accounts associated with the second account; and
   provide access to the second account based on the mapping and with access privileges associated with the one or more predetermined roles associated with the user for the second account.

8. A method for providing role-based access using dynamic shared accounts comprising:
   receiving a request for access to an account, wherein the request comprises an identifier associated with a user;
   authenticating, using at least one computer processor, the user for access to the account;
   identifying one or more predetermined roles associated with the account for the user;
   identifying one or more pseudo accounts corresponding to the one or more predetermined roles, wherein the one or more pseudo accounts enable role-based access control using dynamic shared accounts compatible across multiple applications;
   determining availability of the one or more pseudo accounts and possible alternative pseudo accounts based upon current status;
   mapping the user to the one or more pseudo accounts; and
   providing user access to the account based on the mapping and with access privileges associated with the one or more predetermined roles associated with the user.

9. The method of claim 8, wherein the account is a shared Software-as-a-Service (SaaS) account.

10. The method of claim 8, wherein the identifier comprises at least one of a user identifier and password.

11. The system of claim 8, wherein authenticating the user further comprises providing single sign-on access to at least the account.

12. The method of claim 8, wherein mapping the user to the one or more pseudo accounts comprises a dynamic mapping, wherein the dynamic mapping comprises performing an action in the event the one or more pseudo accounts are unavailable.

13. The method of claim 12, wherein the action comprises at least one of following: notifying the user of the unavailability of the one or more pseudo accounts; halting the mapping action; and determining availability of one or more other pseudo accounts of equal or lesser access privileges and mapping the user to the one or more other pseudo accounts.

14. The method of claim 8, further comprising:
   receiving a request for access to a second account;
   authenticating the user for access to the second account based on a single sign-on access to the second account;
   identifying one or more predetermined roles associated with the second account for the user;

identifying one or more pseudo accounts corresponding to the one or more predetermined roles associated with the second account;
mapping the user to the one or more pseudo accounts associated with the second account; and
providing user access to the second account based on the mapping and with access privileges associated with the one or more predetermined roles associated with the user for the second account.

15. A non-transitory computer-readable storage medium storing a computer program of instructions configured to be readable by at least one computer processor for instructing the at least one computer processor to execute a computer process for performing the method of claim 8.

16. A system for providing role-based access using dynamic shared accounts comprising:
one or more processors communicatively coupled to a network, wherein the one or more processors are configured to:
create at least one account associated with a service;
create one or more roles for the at least one account;
create at least one pseudo account corresponding to each of the one or more roles, wherein the at least one pseudo account enables role-based access control using dynamic shared accounts compatible across multiple applications;
determine availability of the at least one pseudo account and possible alternative pseudo accounts based upon current status; and
assign at least one of the one or more roles to a user for dynamically mapping the user to the at least one pseudo account for access to the at least one account based on the one or more roles.

17. The system of claim 16, wherein the at least one account is at least one shared account and the service is a Software-as-a-Service.

18. A method for providing role-based access using dynamic shared accounts comprising:
creating at least one account associated with a service;
creating one or more roles for the at least one account;
creating, using at least one computer processor, at least one pseudo account corresponding to each of the one or more roles, wherein the at least one pseudo account enables role-based access control using dynamic shared accounts compatible across multiple applications;
determining availability of the at least one pseudo account and possible alternative pseudo accounts based upon current status; and
assigning at least one of the one or more roles to a user for dynamically mapping the user to the at least one pseudo account for access to the at least one account based on the one or more roles.

19. The method of claim 18, wherein the at least one account is at least one shared account and the service is a Software-as-a-Service.

20. A non-transitory computer-readable storage medium storing a computer program of instructions configured to be readable by at least one computer processor for instructing the at least one computer processor to execute a computer process for performing the method of claim 18.

* * * * *